(12) United States Patent
Hwang

(10) Patent No.: US 12,651,550 B2
(45) Date of Patent: Jun. 9, 2026

(54) COMPENSATION SYSTEM OF DISPLAY DEVICE AND COMPENSATION METHOD FOR DISPLAY DEVICE

(71) Applicant: Samsung Display Co., Ltd., Yongin-Si (KR)

(72) Inventor: Jong Kwang Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/826,179

(22) Filed: Sep. 6, 2024

(65) Prior Publication Data

US 2025/0252886 A1    Aug. 7, 2025

(30) Foreign Application Priority Data

Feb. 7, 2024    (KR) ........................ 10-2024-0018809

(51) Int. Cl.
| | |
|---|---|
| *G09G 3/20* | (2006.01) |
| *G06F 3/01* | (2006.01) |
| *G06T 7/70* | (2017.01) |
| *G06T 7/90* | (2017.01) |

(52) U.S. Cl.
CPC .......... *G09G 3/2007* (2013.01); *G06F 3/013* (2013.01); *G06T 7/70* (2017.01); *G06T 7/90* (2017.01); *G06T 2207/10024* (2013.01); *G06T* 2207/30201 (2013.01); *G09G 2320/0242* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 9,761,184 B2 | 9/2017 | Kim et al. | |
| 2020/0284659 A1* | 9/2020 | Yoo ......................... | G01J 3/506 |
| 2021/0343258 A1* | 11/2021 | Kim ..................... | G09G 3/3266 |

FOREIGN PATENT DOCUMENTS

KR        10-2151262 B1      9/2020

* cited by examiner

*Primary Examiner* — Ifedayo B Iluyomade
(74) *Attorney, Agent, or Firm* — Innovation Counsel LLP

(57) ABSTRACT

A compensation system of a display device according to an embodiment includes a display panel including a first emission area and a second emission area different from the first emission area, each of the first emission area and the second emission area including one or more pixels, a camera configured to capture the display panel at one or more viewpoints, and a compensation controller calculating color coordinate data of the first emission area and the second emission area and generating grayscale compensation data based on the color coordinate data. The grayscale compensation data may be for controlling grayscale values of the one or more pixels included in the second emission area.

14 Claims, 17 Drawing Sheets

FIG. 2

<First Viewpoint>

EA: EA1, EA2
PX: PX1, PX2

<Second Viewpoint>

<Embodiment>

| CCD | Value |
|---|---|
| CCD1 | (0.306, 0.314) |
| CCD2 | (0.279, 0.299) |
| CCD3 | (0.305, 0.314) |

CCD: CCD1, CCD2, CCD3

FIG. 15

<Lookup Table>     1500

| VW | GCD |
|---|---|
| VW2 | GCD1 |
| VW3 | GCD2 |
| ⋮ | ⋮ |
| VWk | GCDk−1 |

VW: VW2, VW3, ..., VWk
GCD: GCD1, GCD2, ..., GCDk−1

FIG. 17

COMPENSATION SYSTEM OF DISPLAY DEVICE AND COMPENSATION METHOD FOR DISPLAY DEVICE

CROSS-REFERENCE TO RELATED APPLICATION

The application claims priority to and the benefit of Korean Patent Application No. 10-2024-0018809, filed on Feb. 7, 2024, which is hereby incorporated by reference for all purposes as if fully set forth herein.

BACKGROUND

Field

Embodiments relate to a compensation system of a display device and a compensation method for a display device.

Description of the Related Art

Recently, a flat panel display device such as a liquid crystal display (LCD) device, a plasma display panel (PDP) device, and an organic light emitting display (OLED) device are mainly used as an image display device.

In an organic light emitting display device, a pixel includes a plurality of transistors, a storage capacitor, and an organic light emitting diode. A display panel of the organic light emitting display device may be composed of a plurality of layers, and light output from the display panel may pass through the plurality of layers and be output through an upper surface of the organic light emitting display device.

In this case, a phenomenon in which the light output from the display panel interferes with each other may occur. Accordingly, even when image data of the same color and luminance is output to pixels of the display panel, an image output through the display panel may have irregular color deflection depending on a viewing angle.

The above description is only intended to help understand the background technology of the technical ideas of the inventive concept. Therefore, it cannot be understood as content corresponding to prior art known to those skilled in the art to which the inventive concept pertains.

SUMMARY

An embodiment relates to a compensation system of a display device. A compensation system of a display device according to an embodiment may include a display panel including a first emission area and a second emission area different from the first emission area, each of the first emission area and the second emission area including one or more pixels; a camera configured to capture the display panel at one or more viewpoints; and a compensation controller calculating color coordinate data of the first emission area and the second emission area and generating grayscale compensation data based on the color coordinate data. The grayscale compensation data may be for controlling grayscale values of the one or more pixels included in the second emission area.

The one or more viewpoints may include a first viewpoint; and a second viewpoint inclined by a first angle from the first viewpoint. The compensation controller may include a coordinate calculator. The coordinate calculator may be configured to calculate first color coordinate data of the first emission area corresponding to the first viewpoint, calculate second color coordinate data of the first emission area corresponding to the second viewpoint, and calculate third color coordinate data of the second emission area corresponding to the first viewpoint.

The compensation controller may further include a compensation data generator. The compensation data generator may calculate first grayscale compensation data by adding a value obtained by subtracting the second color coordinate data from the first color coordinate data to the third color coordinate data.

The one or more viewpoints may further include a third viewpoint inclined by a second angle greater than the first angle from the first viewpoint. The coordinate calculator may calculate fourth color coordinate data of the first emission area corresponding to the third viewpoint, and the compensation data generator may calculate second grayscale compensation data by adding a value obtained by subtracting the second color coordinate data from the first color coordinate data to the fourth color coordinate data.

The first grayscale compensation data may include information about grayscale values of the one or more pixels located in the second emission area corresponding to the second viewpoint, and the second grayscale compensation data may include information about grayscale values of the one or more pixels located in the second emission area corresponding to the third viewpoint.

The compensation data generator may interpolate the first grayscale compensation data and the second grayscale compensation data to generate the grayscale compensation data corresponding to at least one viewpoint existing between the second viewpoint and the third viewpoint.

The compensation system of the display device may further include a memory storing the grayscale compensation data, and the memory may store the grayscale compensation data in a form of a lookup table to correspond to each of the one or more viewpoints.

The compensation system of the display device may further include a visual sensor sensing user's eyes on the display device and generating visual sensing data; and a grayscale converter generating image data based on the grayscale compensation data and the visual sensing data.

The visual sensing data may include information about a position between the user's eyes and the display panel.

The first emission area may be disposed in a center of the display panel, and the second emission area may be disposed around the first emission area.

An embodiment relates to a compensation method for a display device. A compensation method for a display device according to an embodiment may include capturing a first emission area of a display panel at a first viewpoint; capturing the first emission area of the display panel at a second viewpoint inclined by a first angle from the first viewpoint; capturing a second emission area of the display panel at the first viewpoint, the second emission area being different from the first emission area; calculating color coordinate data of the first emission area and the second emission area; and generating grayscale compensation data based on the color coordinate data. The grayscale compensation data may be for controlling grayscale values of one or more pixels included in the second emission area.

The calculating the color coordinate data may include calculating first color coordinate data of the first emission area corresponding to the first viewpoint; calculating second color coordinate data of the first emission area corresponding to the second viewpoint; and calculating third color coordinate data of the second emission area corresponding to the first viewpoint.

The generating the grayscale compensation data may include calculating first grayscale compensation data by adding a value obtained by subtracting the second color coordinate data from the first color coordinate data to the third color coordinate data.

The compensation method for the display device may further include capturing the first emission area of the display panel at a third viewpoint inclined by a second angle greater than the first angle from the first viewpoint. The calculating the color coordinate data may include calculating fourth color coordinate data of the first emission area corresponding to the third viewpoint.

The generating the grayscale compensation data may include calculating second grayscale compensation data by adding a value obtained by subtracting the fourth color coordinate data from the first color coordinate data to the third color coordinate data.

The generating the grayscale compensation data may include interpolating the first grayscale compensation data and the second grayscale compensation data to generate the grayscale compensation data corresponding to at least one viewpoint existing between the second viewpoint and the third viewpoint.

The first grayscale compensation data may include information about grayscale values of the one or more pixels located in the second emission area corresponding to the second viewpoint, and the second grayscale compensation data may include information about grayscale values of the one or more pixels located in the second emission area corresponding to the third viewpoint.

The compensation method for the display device may further include generating visual sensing data by sensing user's eyes on the display panel; and generating image data based on the grayscale compensation data and the visual sensing data.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 2 is a block diagram illustrating the compensation system of the display device according to an embodiment.

FIG. 12 is a diagram illustrating values of first to third color coordinate data according to an embodiment.

FIG. 15 is a diagram illustrating a lookup table stored in a memory according to an embodiment.

FIG. 17 is a block diagram illustrating a compensation system of a display device according to an embodiment.

DETAILED DESCRIPTION OF THE ILLUSTRATED EMBODIMENTS

Hereinafter, embodiments of the inventive concept will be described in more detail with reference to the accompanying drawings. It should be noted that in the following description, only the parts necessary to understand the operation according to the inventive concept will be described, and descriptions of other parts will be omitted in order to not obscure the gist of the inventive concept. In addition, the inventive concept is not limited to the embodiments described herein and may be embodied in other forms. The embodiments described herein are provided merely to explain in detail enough to enable those skilled in the art to easily implement the technical idea of the inventive concept.

Figure 1:
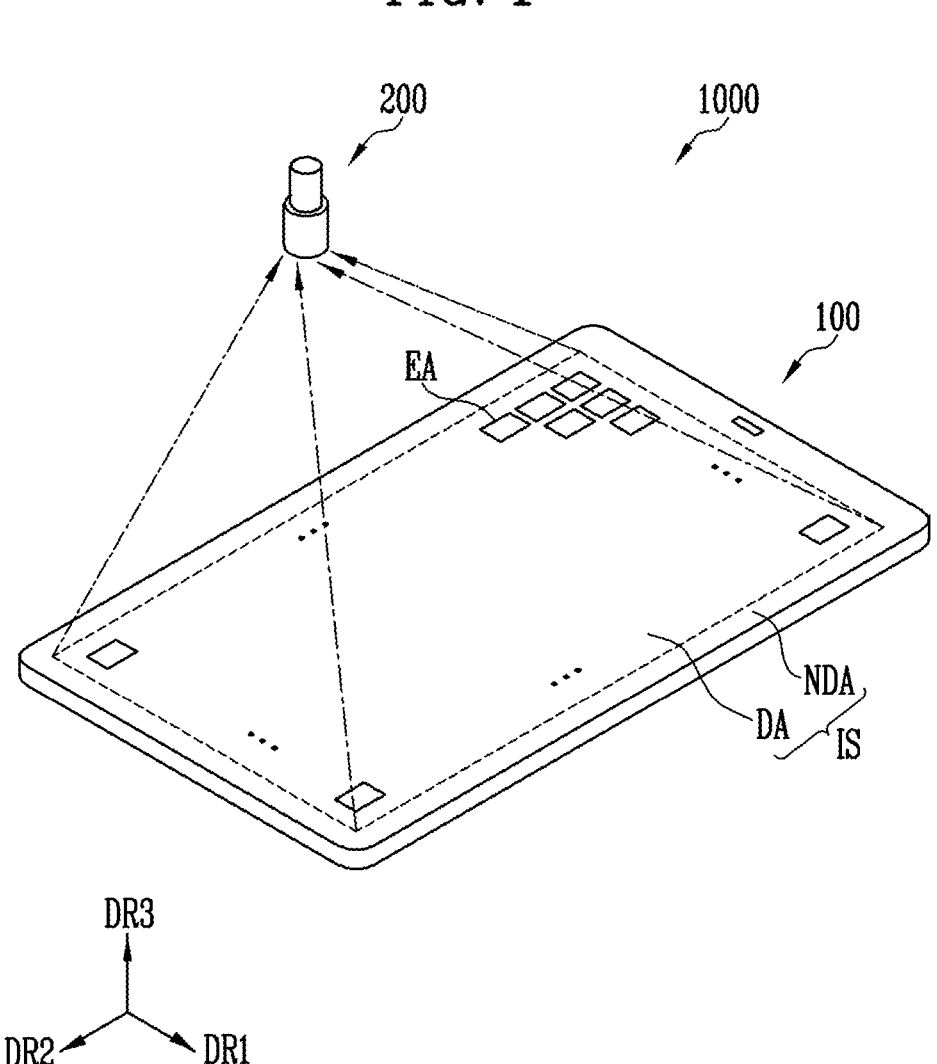
FIG. 1 is a perspective view illustrating a compensation system of a display device according to an embodiment.

FIG. 1 is a perspective view illustrating a compensation system 1000 of a display device 100 according to an embodiment.

Referring to FIG. 1, the compensation system 1000 of the display device 100 may include the display device 100 and a compensation device 200.

The display device 100 may display an image through a display surface IS. In this embodiment, an embodiment in which the display device 100 is implemented as a smartphone will be described as an example. However, the inventive concept is not limited thereto. The inventive concept can be applied if the display device 100 is an electronic device with the display surface IS applied to one side, such as television, a tablet PC, a mobile phone, a video phone, an e-book reader, a desktop PC, a laptop PC, a netbook computer, a workstation, a server, an MP3 player, a medical device, a camera, or a wearable device.

As an embodiment, the display device 100 may be an organic light emitting display device. However, the inventive concept is not limited thereto. As long as the spirit of the inventive concept is not changed, the display device 100 may be implemented as a quantum dot light emitting display device, a liquid crystal display device, a micro LED (light emitting diode) display device, or the like.

The display surface IS may include a display area DA, which is an area where an image is displayed, and a non-display area NDA adjacent to the display area DA.

The non-display area NDA may be an area where an image is not displayed. Sensors, cameras, and the like may be mounted in the non-display area NDA. The display area DA may have a square shape. The non-display area NDA may be arranged to surround the display area DA when viewed on a plane. However, the embodiment is not limited thereto.

The display area DA may include a plurality of emission areas EA that are separated from each other. The emission areas EA may be arranged in a first direction DR1 and a second direction DR2. However, the inventive concept is not limited thereto.

Any one of the emission areas EA may emit light of one grayscale value among grayscale values to be displayed. For example, the grayscale value may be one of 0 to 255 grayscales based on a red pattern, a green pattern, a blue pattern, a mixed color pattern thereof, or a gray pattern. Hereinafter, based on a gray pattern, a case having one grayscale value among 0 to 255 grayscales will be described as an example. However, the embodiment is not limited thereto.

Figure 2:
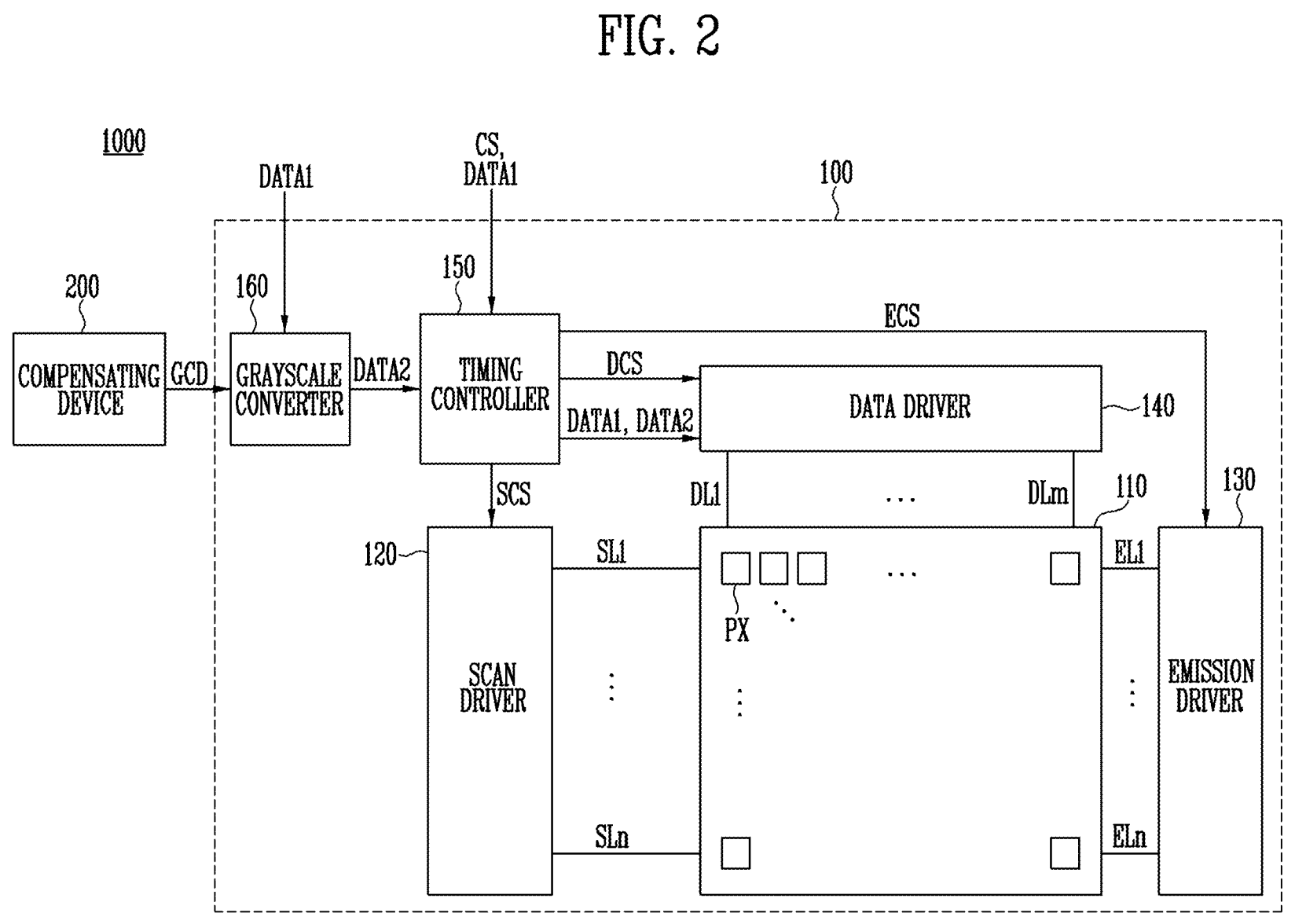

According to an embodiment, an emission area EA may be an area including one or more pixels PX (see FIG. 2). However, hereinafter, the emission area EA will be described as an area including a plurality of pixels PX.

The compensation device 200 may be positioned in front of the display device 100 (for example, a position facing the display surface IS) and may capture an image displayed in the emission area DA. For example, the compensation device 200 may include an imaging means (image capture means) such as a camera. The compensation device 200 may move relative to the display device 100 and capture the display device 100 at a plurality of viewpoints.

Figure 3:
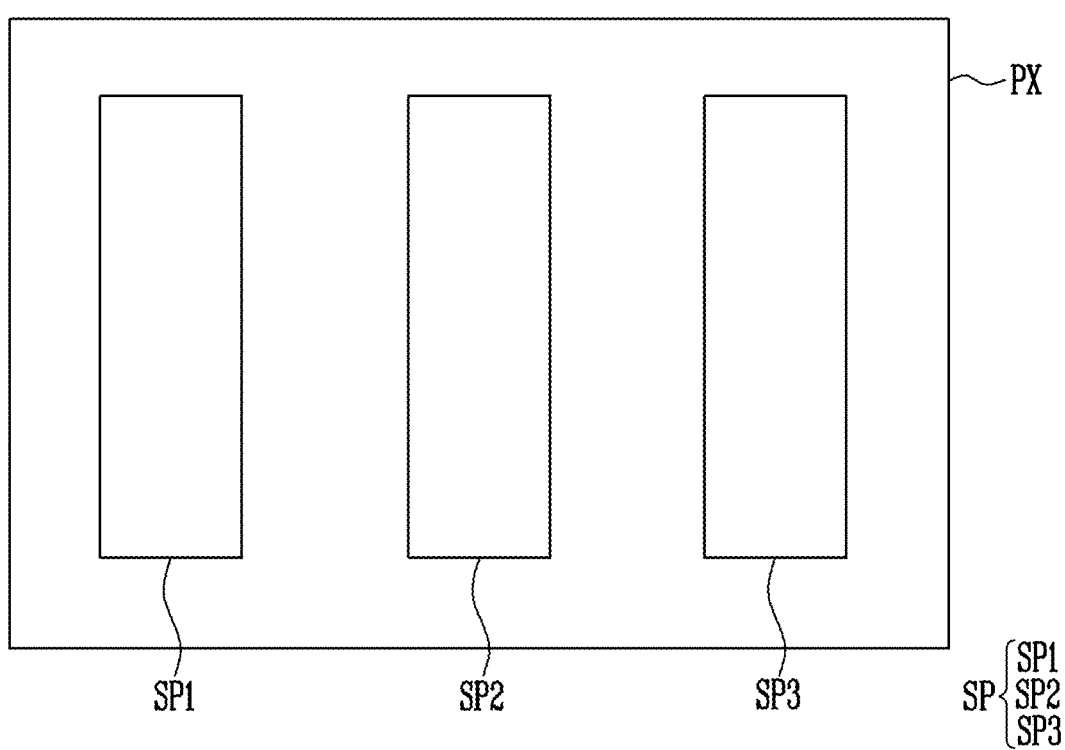
FIG. 3 is a diagram illustrating one of pixels of FIG. 2 as an example.

FIG. 2 is a block diagram illustrating the compensation system 1000 of the display device 100 according to an embodiment. FIG. 3 is a diagram illustrating one of pixels PX of FIG. 2 as an example.

Referring to FIG. 2, the compensation system 1000 of the display device 100 may include the display device 100 and the compensation device 200.

The display device 100 may include a display panel 110, a scan driver 120, an emission driver 130, a data driver 140, a timing controller 150, and a grayscale converter 160.

Referring to FIGS. 2 and 3, the display panel 110 may include one or more pixels PX. Each pixel PX may include a plurality of sub-pixels SP. For example, the pixel PX may include a first sub-pixel SP1, a second sub-pixel SP2, and a third sub-pixel SP3. The first sub-pixel SP1, the second sub-pixel SP2, and the third sub-pixel SP3 may each emit primary color light to configure three primary colors of light.

The first sub-pixel SP1 may be a sub-pixel SP that emits light of a first color. The second sub-pixel SP2 may be a sub-pixel SP that emits light of a second color different from the first color. The third sub-pixel SP3 may be a sub-pixel SP that emits light of a third color different from the first color and the second color.

The first color may be, for example, a color belonging to a red wavelength band. The second color may be, for example, a color belonging to a green wavelength band. The third color may be, for example, a color belonging to a blue wavelength band.

For example, the first sub-pixel SP1 may emit light in a wavelength range of approximately 630 nm to 750 nm. For example, the second sub-pixel SP2 may emit light in a wavelength range of approximately 495 nm to 570 nm. For example, the third sub-pixel SP3 may emit light in a wavelength range of approximately 450 nm to 495 nm.

Unlike the above, the first sub-pixel SP1 may emit light in a green wavelength band or a blue wavelength band, the second sub-pixel SP2 may emit light in a blue wavelength band or a red wavelength band, and the third sub-pixel SP3 may emit light in a red wavelength band or a green wavelength band.

According to an embodiment, the sub-pixels SP may be arranged according to an arrangement structure such as a stripe or PENTILE™, but the inventive concept is not limited thereto, and various embodiments may be applied to the present disclosure.

Each of the sub-pixels SP may be connected to first to n-th scan lines SL1 to SLn, first to m-th data lines DL1 to DLm, and first to n-th emission control lines EL1 to ELn, where n and m may be integers greater than or equal to 1.

The scan driver 120 may be configured to supply a scan signal to the plurality of scan lines SL1 to SLn. According to an embodiment, the scan driver 120 may be configured to sequentially supply the scan signal to the plurality of scan lines SL1 to SLn, but the inventive concept is not limited thereto. The scan driver 120 may receive a scan driving signal SCS and supply the scan signal to the plurality of scan lines SL1 to SLn according to timing.

The emission driver 130 may be configured to supply an emission signal to the plurality of emission lines EL1 to ELn. According to an embodiment, the emission driver 130 may be configured to sequentially supply the emission signal to the plurality of emission lines EL1 to ELn, but the inventive concept is not limited thereto. The emission driver 130 may receive an emission driving signal ECS and supply the emission signal to the plurality of emission lines EL1 to ELn according to timing.

The data driver 140 may be configured to supply (apply or output) a data voltage to the plurality of data lines DL1 to DLm. The data driver 140 may receive a data driving signal DCS, first image data DATA1, and second image data DATA2, and supply the data voltage corresponding to the image data to the plurality of data lines DL1 to DLm according to timing.

The timing controller 150 may receive a control signal CS and the first image data DATA1 from an external source (for example, a processor). In addition, the timing controller 150 may receive the second image data DATA2 from the grayscale converter 160. The timing controller 150 may output the data driving signal DCS, the scan driving signal SCS, the emission driving signal ECS, the first image data DATA1, and the second image data DATA2 based on the input control signal CS, the first image data DATA1, and the second image data DATA2. For example, the timing controller 150 may transmit the received first image data DATA1 and second image data DATA2 to the data driver 140.

The grayscale converter 160 may receive the first image data DATA1 from outside. In addition, the grayscale converter 160 may receive grayscale compensation data GCD from the compensation device 200. The grayscale converter 160 may generate the second image data DATA2 by reflecting the grayscale compensation data GCD in the first image data DATA1. In this case, the grayscale compensation data GCD may be a signal for controlling a grayscale value of at least one pixel PX of the display panel 110. For example, the grayscale value of at least one pixel PX of the display panel 110 driven based on the second image data DATA2 may different from the grayscale value of at least one pixel PX of the display panel 110 driven based on the first image data DATA1.

Figure 4:
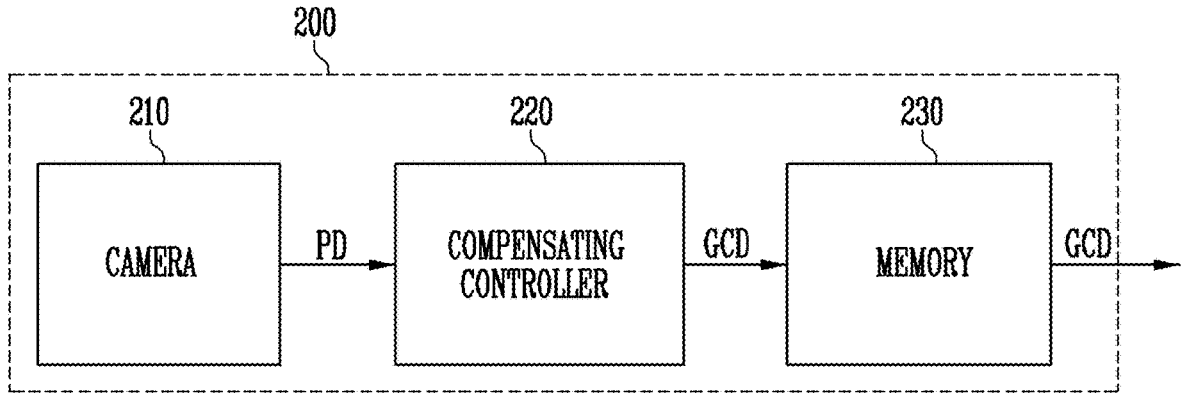
FIG. 4 is a block diagram illustrating a compensation device according to an embodiment.
Figure 5:
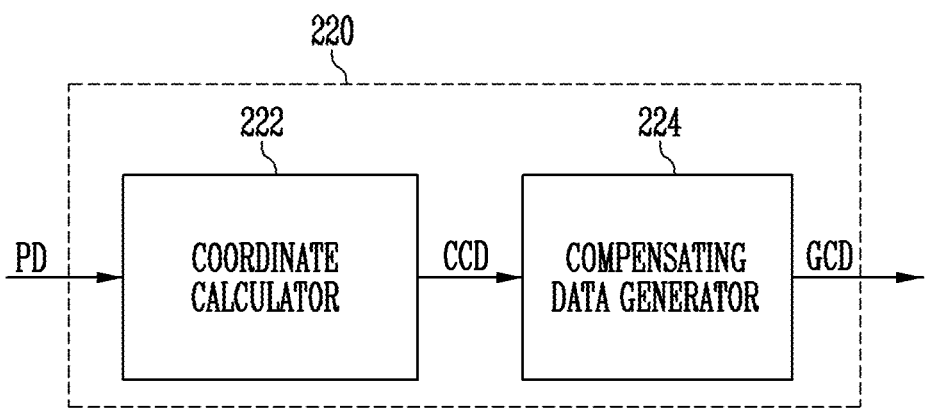
FIG. 5 is a block diagram illustrating an embodiment of a compensation controller of FIG. 4.

FIG. 4 is a block diagram illustrating a compensation device 200 according to an embodiment. FIG. 5 is a block diagram illustrating an embodiment of a compensation controller 220 of FIG. 4.

Referring to FIG. 4, the compensation device 200 may include a camera 210, the compensation controller 220, and a memory 230.

The camera 210 may include an image sensor. According to an embodiment, the camera 210 may be a charge coupled device (CCD) camera. The camera 210 may capture at least one emission area EA (see FIG. 1). Accordingly, the camera 210 may generate parameter data PD for each of the emission areas EA based on the captured image. The parameter data PD may include light characteristic information of the emission area EA. According to an embodiment, the parameter data PD may include light characteristic information output from each of the pixels PX included in the emission area EA. As an example, the parameter data PD may be data about luminance information of light output from the pixels PX included in the emission area EA.

Referring to FIGS. 4 and 5, the compensation controller 220 may include a coordinate calculator 222 and a compensation data generator 224. The compensation controller 220 may generate the grayscale compensation data GCD based on the parameter data PD.

The coordinate calculator 222 may generate color coordinate data CCD based on the parameter data PD. The color coordinate data CCD may include information about color coordinates of each of the emission areas EA (see FIG. 1).

The compensation data generator 224 may receive the color coordinate data CCD. The compensation data generator 224 may generate the grayscale compensation data GCD based on the supplied color coordinate data CCD. This will be described in detail below.

The memory 230 may be configured to be disposed within the compensation device 200. However, the inventive concept is not limited thereto. For example, according to an embodiment, the memory 230 may be configured to be mounted within the display device 100 (see FIG. 1).

The memory 230 may store the grayscale compensation data GCD received from the compensation controller 220. The memory 230 may be a flash memory, but is not limited thereto as long as it can store the grayscale compensation data GCD.

Hereinafter, a compensation method for a display device according to embodiments will be described with reference to FIGS. 6 to 16.

Figure 6:
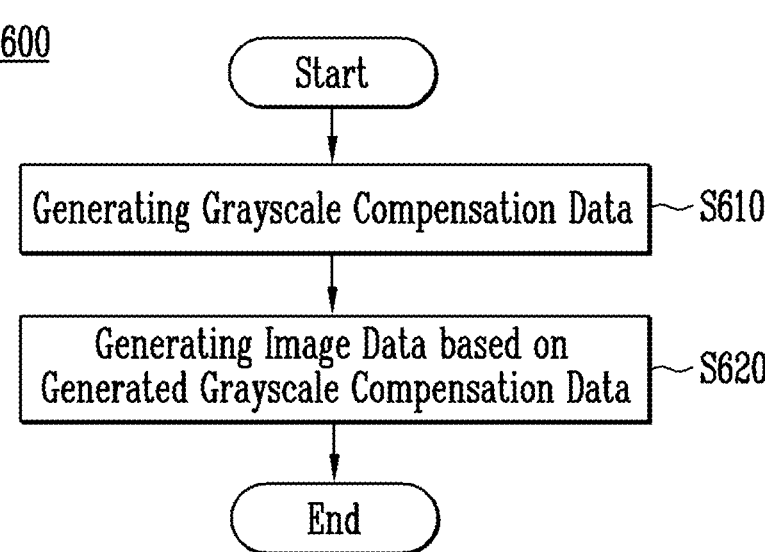
FIG. 6 is a flowchart illustrating a compensation method for a display device according to an embodiment.
Figure 7:
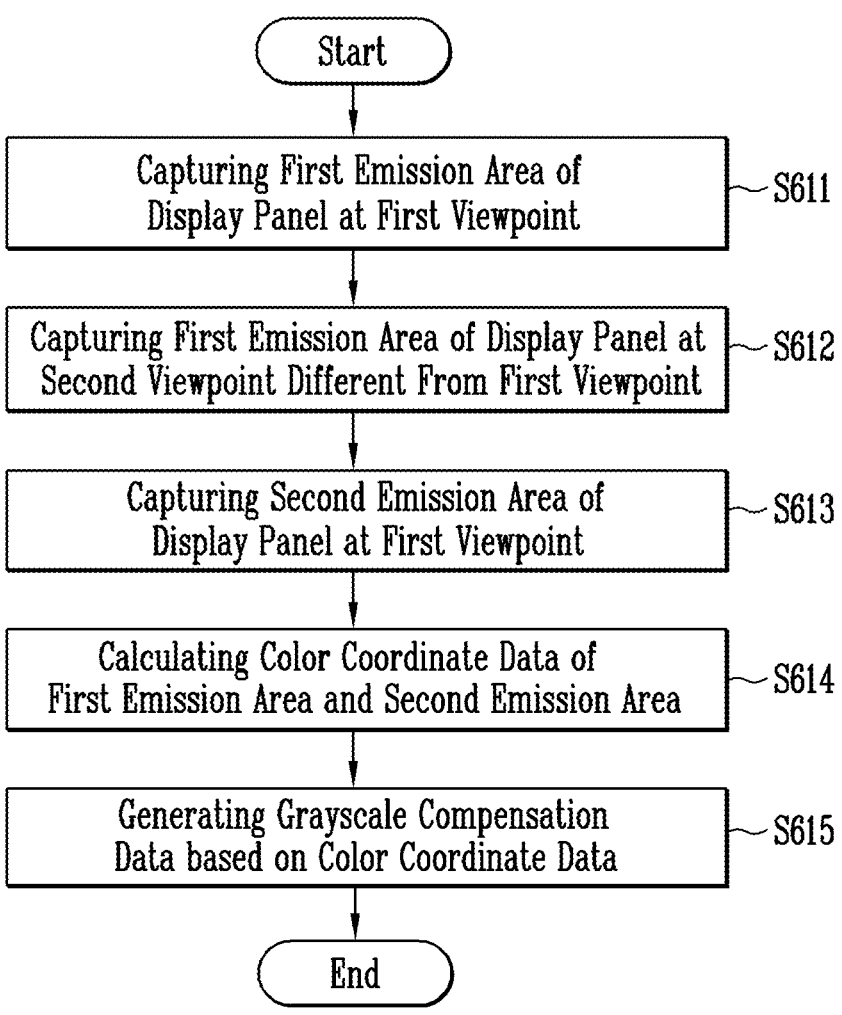
FIG. 7 is a flowchart illustrating an embodiment of a step of FIG. 6.
Figure 8:
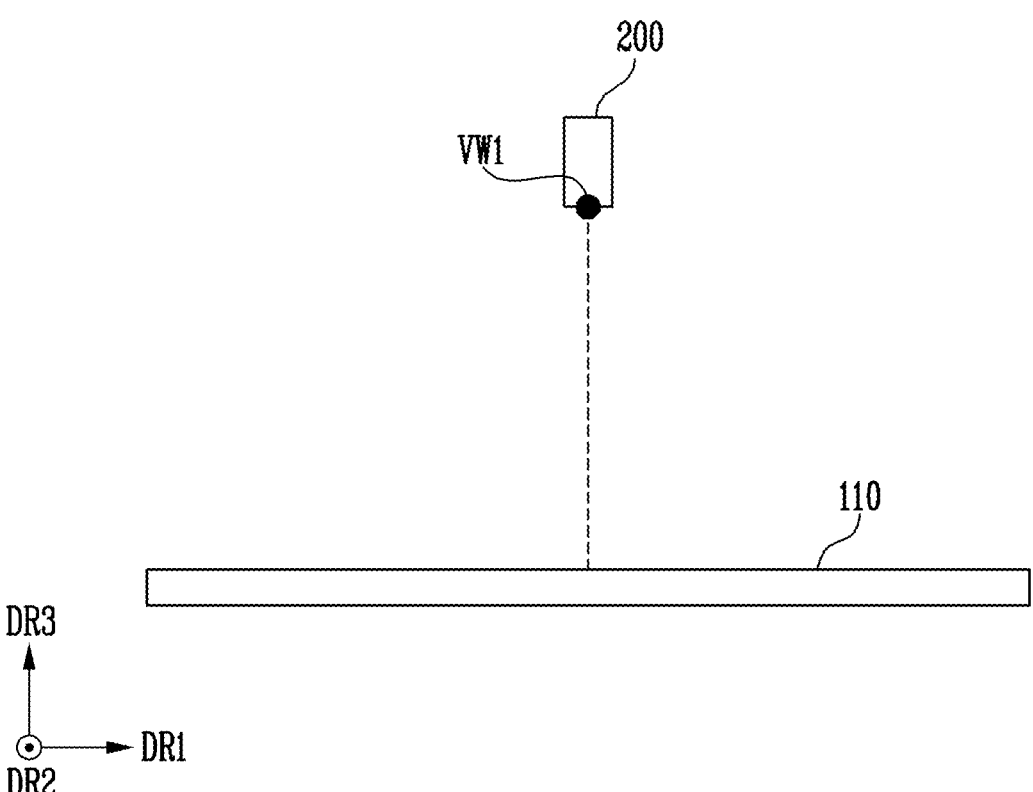
FIG. 8 is a side view illustrating a compensation device and a display panel disposed at a first viewpoint.
Figure 9:
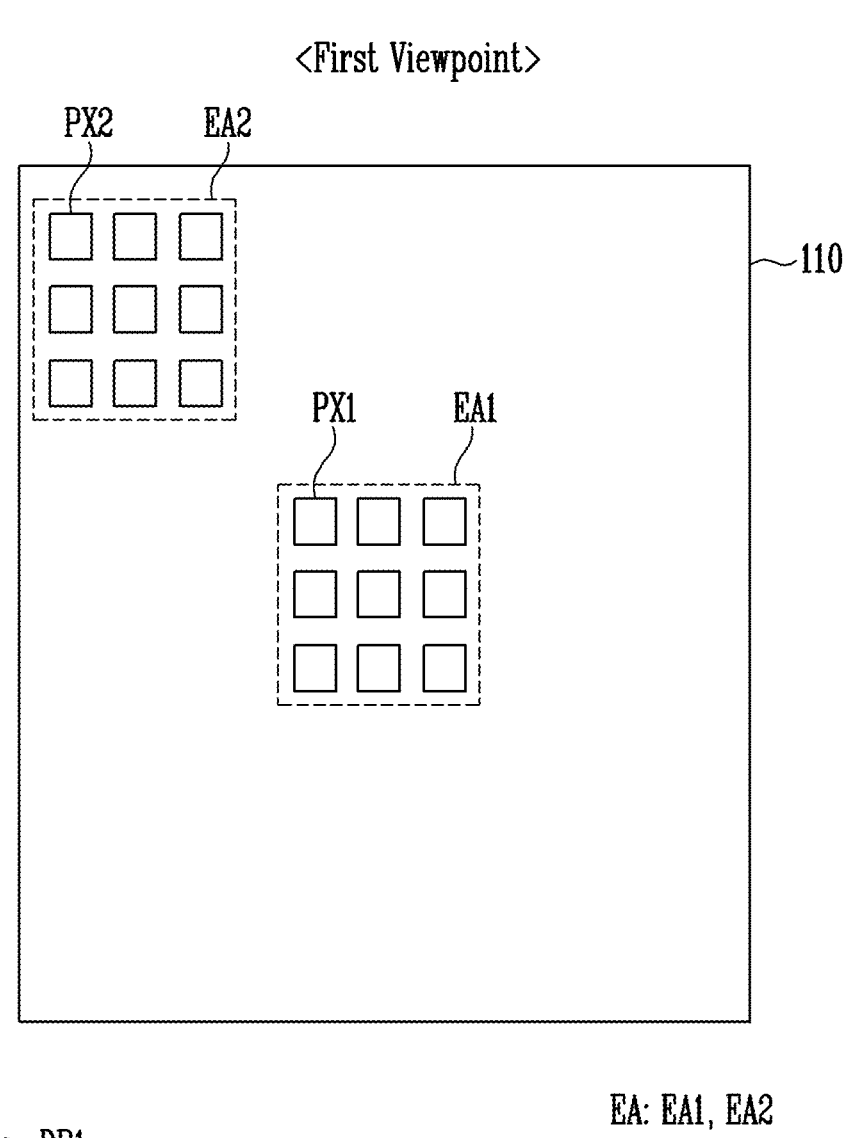
FIG. 9 is a plan view illustrating the display panel captured by the compensation device of FIG. 8.
Figure 9:
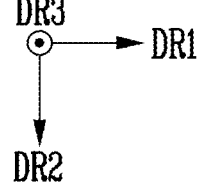
Figure 10:
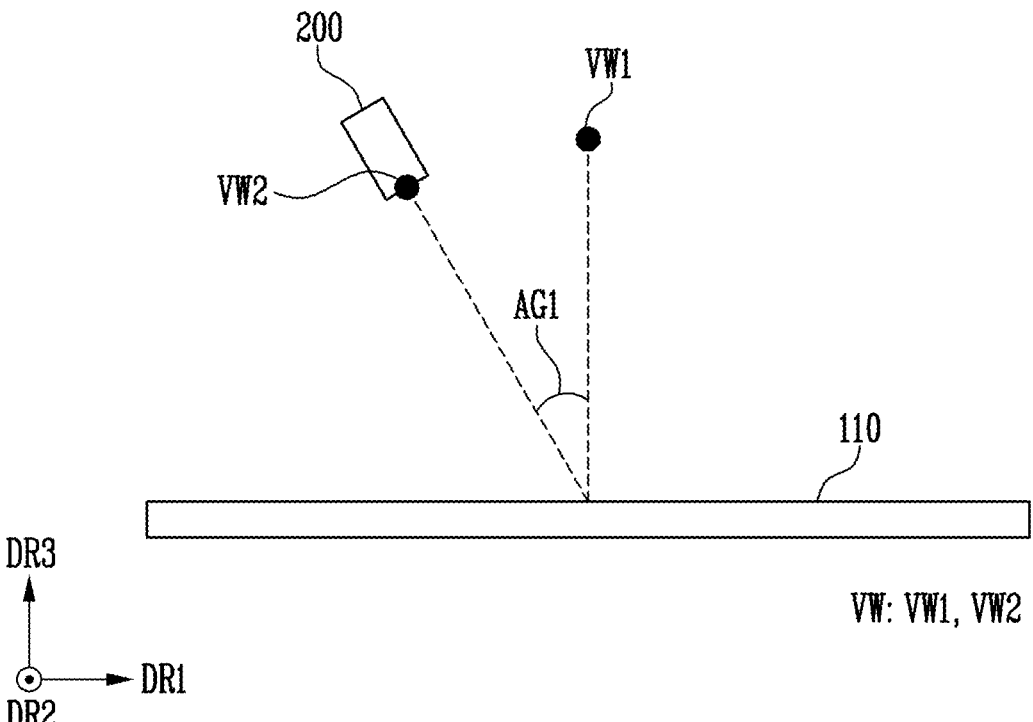
FIG. 10 is a side view illustrating the compensation device and the display panel disposed at a second viewpoint.
Figure 11:
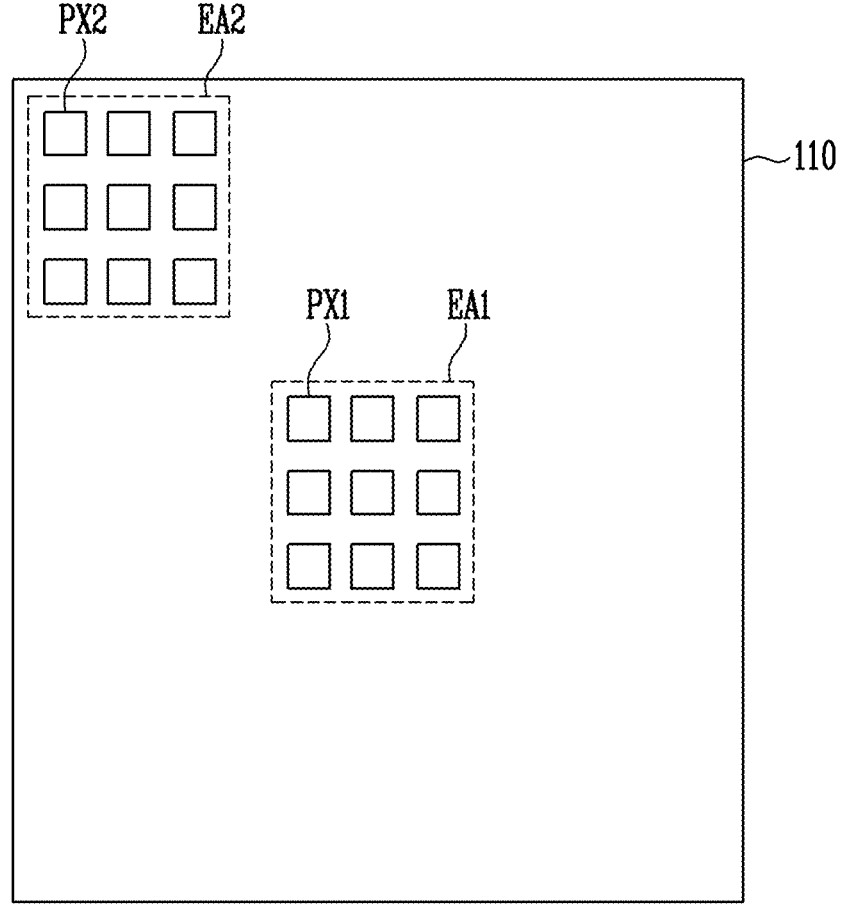
FIG. 11 is a plan view illustrating the display panel captured by the compensation device of FIG. 10.
Figure 11:
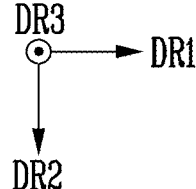

FIG. 6 is a flowchart illustrating a compensation method for a display device according to an embodiment. FIG. 7 is a flowchart illustrating an embodiment of a step S610 of generating grayscale compensation data of FIG. 6. FIG. 8 is a side view illustrating a compensation device 200 and a display panel 110 disposed at a first viewpoint VW1. FIG. 9 is a plan view illustrating the display panel 110 captured by the compensation device 200 of FIG. 8. FIG. 10 is a side view illustrating the compensation device 200 and the display panel 110 disposed at a second viewpoint VW2. FIG. 11 is a plan view illustrating the display panel 110 captured by the compensation device 200 of FIG. 10. FIG. 12 is a diagram illustrating values of first to third color coordinate data CCD1 to CCD3 according to an embodiment.

Referring to FIG. 6, a compensation method 600 of a display device according to an embodiment may include generating grayscale compensation data in the step S610 and generating image data based on the generated grayscale compensation data in a step S620.

Referring to FIG. 7, the generating the grayscale compensation data in the step S610 may include capturing a first emission area of a display panel at a first viewpoint in a step S611, capturing the first emission area of the display panel at a second viewpoint different from the first viewpoint in a step S612, capturing a second emission area of the display panel at the first viewpoint in a step S613, calculating color coordinate data of the first emission area and the second emission area in a step S614, and generating the grayscale compensation data based on the color coordinate data in a step S615.

The present specification describes an embodiment in which steps are performed sequentially according to a flowchart. However, unless the spirit of the inventive concept is changed, it is obvious that some steps shown to be performed sequentially may be performed simultaneously, the order of the steps may be changed, some steps may be omitted, or other steps may be further included between the steps.

Referring to FIGS. 6 to 9, in the capturing the first emission area of the display panel at the first viewpoint in the step S611, the compensation device 200 may be disposed at the first viewpoint VW1 to capture a first emission area EA1 of the display panel 110. For example, the compensation device 200 may capture the first emission area EA1 in a direction parallel to a third direction DR3 based on the first emission area EA1 of the display panel 110.

Referring to FIG. 9, the display panel 110 may include the first emission area EA1 and a second emission area EA2 that is different from the first emission area EA1. The first emission area EA1 may be disposed in the center of the display panel 110. The second emission area EA2 may be disposed around the first emission area EA1. For example, the second emission area EA2 may be spaced apart from the first emission area EA1 and may be disposed adjacent to a corner of the display panel 110. However, the inventive concept is not limited thereto. In addition, according to an embodiment, a plurality of second emission areas EA2 may be provided. For example, the second emission areas EA2 may be disposed adjacent to corners of the display panel 110.

The first emission area EA1 may include first pixels PX1. However, the inventive concept is not limited thereto. For example, the first emission area EA1 may include a single first pixel PX1.

The second emission area EA2 may include second pixels PX2. However, the inventive concept is not limited thereto. For example, the second emission area EA2 may include a single second pixel PX2.

Each of the first pixels PX1 may output light having the same grayscale value. In addition, each of the second pixels PX2 may output light having the same grayscale value. In an embodiment, a grayscale value (or luminance) of light output from the first pixels PX1 may be different from a grayscale value (or luminance) of light output from the second pixels PX2. However, embodiments of the present disclosure are not limited thereto.

Referring to FIGS. 6 to 11, in the capturing the first emission area of the display panel at the second viewpoint different from the first viewpoint in the step S612, the compensation device 200 may be disposed at the second viewpoint VW2 to capture the first emission area EA1 of the display panel 110. For example, the compensation device 200 may move from the first viewpoint VW1 to the second viewpoint VW2 inclined by a first angle AG1. Accordingly, the compensation device 200 may capture the first emission area EA1 at the second viewpoint VW2. In this case, the second viewpoint VW2 may be located at a position inclined by the first angle AG1 in a direction opposite to the first direction DR1 (or counterclockwise) from the first viewpoint VW1.

Referring to FIGS. 6 to 9, in the capturing the second emission area of the display panel at the first viewpoint in the step S613, the compensation device 200 may be disposed at the first viewpoint VW1 to capture the second emission area EA2 of the display panel 110. For example, the compensation device 200 may move from the second viewpoint VW2 back to the first viewpoint VW1. However, the inventive concept is not limited thereto. In other words, according to an embodiment, in the capturing the first emission area of the display panel at the first viewpoint in the step S611, the compensation device 200 may capture the second emission area EA2 of the display panel 110 at the first viewpoint VW1.

Referring to FIGS. 6 to 12, in the calculating the color coordinate data of the first emission area and the second emission area in the step S614, the compensation device 200 may calculate the color coordinate data CCD for each of the first emission area EA1 and the second emission area EA2 based on the parameter data PD (see FIG. 4) generated by capturing the display panel 110.

The coordinate calculator 222 (see FIG. 5) may calculate the first color coordinate data CCD1 based on the parameter data PD of the first emission area EA1 at the first viewpoint VW1. The first color coordinate data CCD1 may be a color coordinate value of the first emission area EA1 when the first emission area EA1 is captured at the first viewpoint VW1. For example, color coordinates may be measured based on CIE1931 color coordinates known in the art. In the above embodiment, the first color coordinate data CCD1 may be (0.306, 0.314). However, the inventive concept is not limited thereto.

The coordinate calculator 222 may calculate the second color coordinate data CCD2 based on the parameter data PD of the first emission area EA1 at the second viewpoint VW2. The second color coordinate data CCD2 may be a color coordinate value of the first emission area EA1 when the first emission area EA1 is captured at the second viewpoint VW2. According to an embodiment, the second color coordinate data CCD2 may be (0.279, 0.299). However, the inventive concept is not limited thereto.

The coordinate calculator 222 may calculate the third color coordinate data CCD3 based on the parameter data PD of the second emission area EA2 at the first viewpoint VW1. The third color coordinate data CCD3 may be a color coordinate value of the second emission area EA2 when the second emission area EA1 is captured at the first viewpoint VW1. According to an embodiment, the third color coordinate data CCD3 may be (0.305, 0.314). However, the inventive concept is not limited thereto.

Referring to FIGS. 6 to 12, in the generating the grayscale compensation data based on the color coordinate data in the step S615, the compensation data generator 224 (see FIG. 5) may subtract the second color coordinate data CCD2 from the first color coordinate data CCD1. In addition, the compensation data generator 224 may add the value obtained through the subtraction to the third color coordinate data CCD3 and generate first grayscale compensation data GCD1 (e.g., see FIG. 15) based on the value obtained through the addition. In this case, the first grayscale compensation data GCD1 may be data about a color coordinate value of the second emission area EA2 when viewed from the second viewpoint VW2. That is, the color coordinate value of the second emission area EA2 driven based on the first grayscale compensation data GCD1 may be the same as a value derived through the above-described calculation process. According to the above-described embodiment, the color coordinate value of the second emission area EA2 controlled according to the first grayscale compensation data GCD1 may be (0.332, 0.329). However, the inventive concept is not limited thereto.

Referring to FIGS. 6 to 11, in the generating the image data based on the generated grayscale compensation data in the step S620, the grayscale converter 160 (see FIG. 2) may generate the second image data DATA2 (see FIG. 2) by reflecting the first grayscale compensation data GCD1. For example, the grayscale converter 160 may generate the second image data DATA2 by reflecting the first grayscale compensation data GCD1 to the first image data DATA1 (see FIG. 2). In this case, a grayscale value of light output from the second pixel PX2 driven by the second image data DATA2 may be a compensated grayscale value. In other words, the grayscale value of the second pixel PX2 when viewed from the second viewpoint VW2 may be the same as the grayscale value of the second pixel PX2 when viewed from the first viewpoint VW1.

According to a comparative example, the grayscale value of the second pixel PX2 when viewed from the first viewpoint VW1 may be different from the grayscale value of the second pixel PX2 when viewed from the second viewpoint VW2. For example, the display panel 110 may be composed of a plurality of layers. Light output from the second pixel PX2 may pass through the plurality of layers and be output through an upper surface of the display device 100 (see FIG. 1). In this case, a phenomenon in which lights output from the display device 100 interfere with each other may occur. Accordingly, an image visually recognized by a user of the display device 100 may vary depending on an angle from which the display device 100 is observed. For example, a grayscale value of light output from the second pixels PX2 and observed at the first viewpoint VW1 may be different from a grayscale value of light output from the second pixels PX2 and observed at the second viewpoint VW2. Accordingly, an image output from the display device 100 may be visually recognized differently by the user of the display device 100 depending on a plurality of viewpoints VW, and the quality of the image visually recognized by the user of the display device 100 may also deteriorate.

However, according to the embodiments, an image output from the display device 100 may be visually recognized equally by the user of the display device 100 at the first view point VW1 and the second view point VW2. In other words, the image output from the display device 100 may be visually recognized relatively uniformly by the user of the display device 100 at the plurality of viewpoints VW, and the display device 100 may output the image with improved quality.

Figure 13:
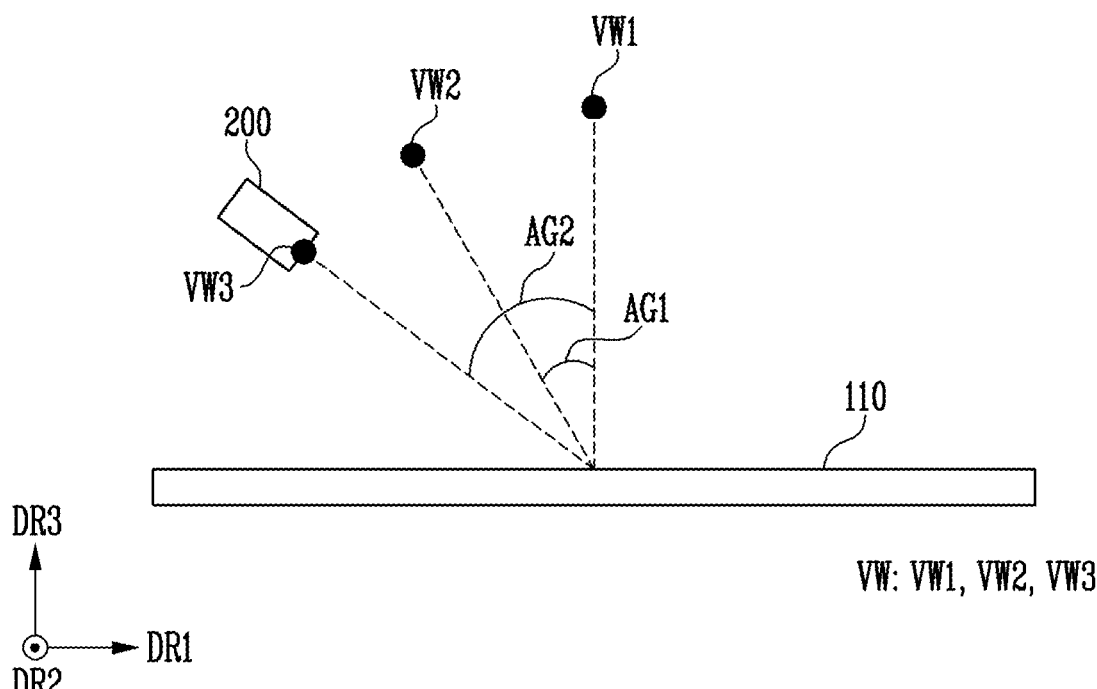
FIG. 13 is a side view illustrating the compensation device and the display panel disposed at a third viewpoint.
Figure 14:
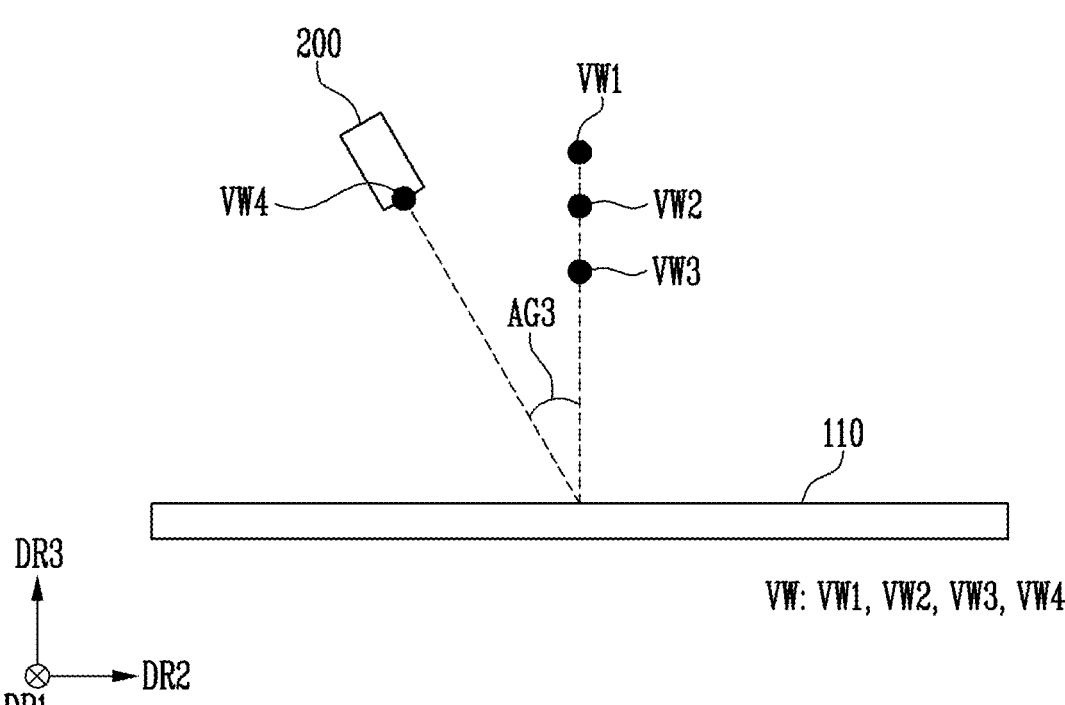
FIG. 14 is a side view illustrating the compensation device and the display panel disposed at a fourth viewpoint.

FIG. 13 is a side view illustrating the compensation device 200 and the display panel 110 disposed at a third viewpoint VW3. FIG. 14 is a side view illustrating the compensation device 200 and the display panel 110 disposed at a fourth viewpoint VW4. FIG. 15 is a diagram illustrating a lookup table 1500 stored in a memory according to an embodiment.

Referring to FIGS. 6 and 13, the generating the grayscale compensation data in the step S610 may further include capturing the first emission area EA1 by the compensation device 200 at the third viewpoint VW3. For example, the compensation device 200 may be disposed at the third viewpoint VW3 inclined by a second angle AG2 greater than the first angle AG1 from the first viewpoint VW1 to capture the first emission area EA1. In this case, the third viewpoint VW3 may be located at a position inclined by the second angle AG2 in a direction opposite to the first direction DR1 (for example, counterclockwise) from the first viewpoint VW1.

Referring to FIGS. 7 to 13, in the calculating the color coordinate data of the first emission area and the second emission area in the step S614, the compensation device 200 may calculate fourth color coordinate data of the first emission area EA1 based on the parameter data PD (see FIG. 4) generated by capturing at the third viewpoint VW3. The fourth color coordinate data described above may be a color coordinate value of the first emission area EA1 when the first emission area EA1 is captured at the third viewpoint VW3.

Referring to FIGS. 7 to 14, in the generating the grayscale compensation data based on the color coordinate data in the step S615, the compensation data generator 224 (see FIG. 5) may subtract the fourth color coordinate data from the first color coordinate data CCD1. In addition, the compensation data generator 224 may add the value obtained through the subtraction to the third color coordinate data CCD3 and generate second grayscale compensation data GCD2 (e.g., see FIG. 15) based on the value obtained through the addition. In this case, the second grayscale compensation data GCD2 may be data about a color coordinate value of the second emission area EA2 when viewed from the third viewpoint VW3. That is, the color coordinate value of the second emission area EA2 driven based on the second grayscale compensation data GCD2 may be the same as a value derived through the above-described calculation process.

Referring to FIGS. 6 and 14, according to an embodiment, in the generating the grayscale compensation data in the step S610, the compensation device 200 may be disposed at the fourth viewpoint VW4 to capture the first emission area EA1. For example, the compensation device 200 may be disposed at the fourth viewpoint VW4 inclined by a third angle AG3 from the first viewpoint VW1 to capture the first emission area EA1. In this case, the fourth viewpoint VW4 may be located at a position inclined by the third angle AG3 in a direction opposite to the second direction DR2 from the first to third viewpoints VW1 to VW3.

Referring to FIGS. 7 to 14, in the calculating the color coordinate data of the first emission area and the second emission area in the step S614, the compensation device 200 may calculate fifth color coordinate data of the first emission area EA1 based on the parameter data PD (see FIG. 4) generated by capturing at the fourth viewpoint VW4. The fifth color coordinate data described above may be a color coordinate value of the first emission area EA1 when the first emission area EA1 is captured at the fourth viewpoint VW4.

Referring to FIGS. 7 to 14, in the generating the grayscale compensation data based on the color coordinate data in the step S615, the compensation data generator 224 (see FIG. 5) may subtract the fifth color coordinate data from the first color coordinate data CCD1. In addition, the compensation data generator 224 may add the value obtained through the subtraction to the third color coordinate data CCD3 and generate third grayscale compensation data GCD3 (e.g., see FIG. 15) based on the value obtained through the addition. In this case, the third grayscale compensation data GCD3 may be data about a color coordinate value of the second emission area EA2 when viewed from the fourth viewpoint VW4. That is, the color coordinate value of the second emission area EA2 driven based on the third grayscale compensation data GCD3 may be the same as a value derived through the above-described calculation process.

Referring to FIGS. 13 to 15, the compensation device 200 may store the grayscale compensation data GCD corresponding to each of the plurality of viewpoints VW. For example, the memory 230 (see FIG. 4) may store a plurality of grayscale compensation data GCD generated by the compensation controller 220 (see FIG. 4) in the form of the lookup table 1500. For example, the lookup table 1500 may include first to (k−1)th grayscale compensation data GCD1 to GCDk−1 corresponding to (e.g., associated with) each of second to k-th viewpoints VW2 to VWk (k may be an integer greater than or equal to 1). According to an embodiment, the first grayscale compensation data GCD1 may correspond to the second viewpoint VW2, and the second grayscale compensation data GCD2 may correspond to the third viewpoint VW3.

Figure 16:
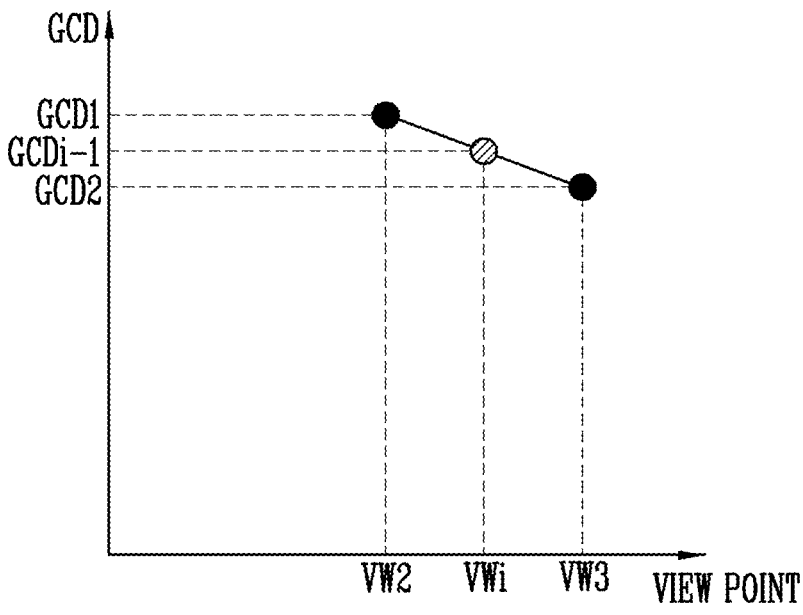
FIG. 16 is a graph illustrating grayscale compensation data corresponding to each of a plurality of viewpoints.

FIG. 16 is a graph illustrating grayscale compensation data corresponding to each of a plurality of viewpoints.

Referring to FIGS. 7 and 13 to 16, in the generating the grayscale compensation data based on the color coordinate data in the step S615, the compensation device 200 may interpolate the first grayscale compensation data GCD1 and the second grayscale compensation data GCD2 to generate the grayscale compensation data GCD corresponding to at least one viewpoint existing between the second viewpoint VW2 and the third viewpoint VW3. For example, an i-th viewpoint VWi may be any one of viewpoints VW existing between the second viewpoint VW2 and the third viewpoint VW3. In other words, the i-th viewpoint VWi may be one of viewpoints VW inclined by an angle greater than the first angle AG1 and smaller than the second angle AG2 from the first viewpoint VW1. In this case, the compensation data generator 224 (see FIG. 5) may interpolate the first grayscale compensation data GCD1 and the second grayscale compensation data GCD2 to generate an (i−1)th grayscale compensation data GCDi−1 corresponding to the i-th viewpoint VWi.

Figure 17:
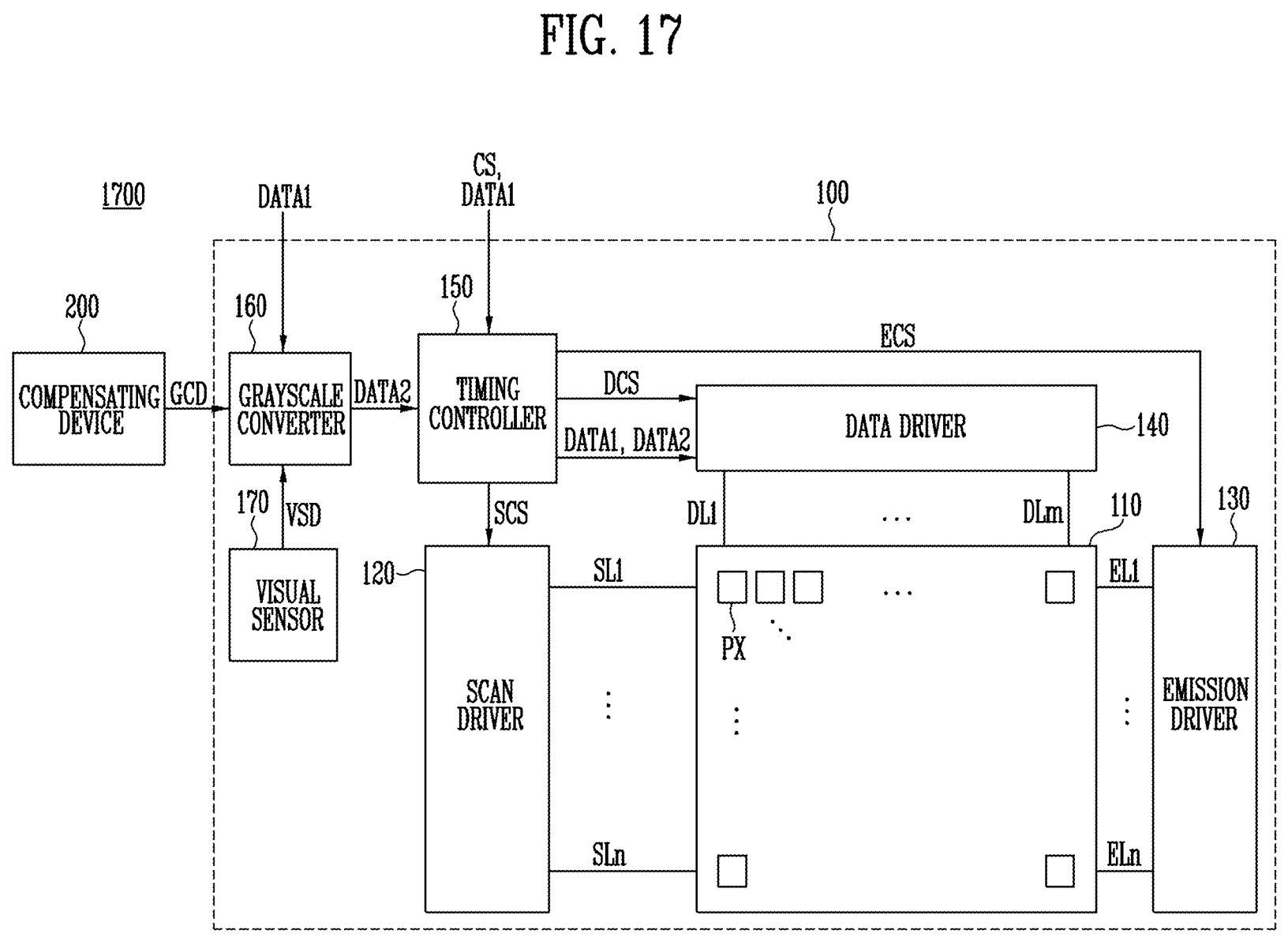

FIG. 17 is a block diagram illustrating a compensation system 1700 of a display device 100 according to an embodiment.

Referring to FIG. 17, a compensation system 1700 of the display device 100 may include the display device 100 and a compensation device 200.

The display device 100 may include a display panel 110, a scan driver 120, an emission driver 130, a data driver 140, a timing controller 150, a grayscale converter 160, and a visual sensor 170. The display panel 110, the scan driver 120, the emission driver 130, the data driver 140, the timing controller 150, the grayscale converter 160, and the compensation device 200 of FIG. 17 can be described similarly to the display panel 110, the scan driver 120, the emission driver 130, the data driver 140, the timing controller 150, the grayscale converter 160, and the compensation device 200 of FIG. 2. Hereinafter, overlapping descriptions will be omitted.

The visual sensor 170 may include a camera that captures user's eyes on the display device 100. The visual sensor 170 may acquire an image corresponding to the captured user's eyes. The visual sensor 170 may generate visual sensing data VSD based on the acquired image. The generated visual sensing data VSD may be transmitted to the grayscale converter 160. The visual sensing data VSD may include information about a position between the user's eyes and the display panel 110 in the display device 100. For example, the visual sensing data VSD may include information about a viewing angle of the user of the display device 100.

The grayscale converter 160 may receive the visual sensing data VSD from the visual sensor 170. The grayscale converter 160 may generate the second image data DATA2 based on the grayscale compensation data GCD and the visual sensing data VSD. For example, the grayscale converter 160 may generate the second image data DATA2 by reflecting the grayscale compensation data GCD at the viewpoint VW (see FIG. 15) corresponding to the viewing angle of the user of the display device 100. Accordingly, the display device 100 may output light in which a grayscale value of the pixel PX is compensated according to the viewing angle of the display device 100.

According to the compensation system of the display device and the compensation method for the display device according to the embodiments, an image that a user of the display device can visually recognized relatively uniformly at a plurality of viewpoints can be output.

Effects according to the embodiments are not limited to those described above, and various other effects are included in the present specification.

Although specific embodiments and applications have been described herein, other embodiments and variations may be derived from the above description. Accordingly, the spirit of the inventive concept is not limited to these embodiments, but extends to the scope of the claims set forth below, various obvious modifications, and equivalents.

What is claimed is:

1. A compensation system of a display device comprising:
    a display panel including a first emission area and a second emission area different from the first emission area, each of the first emission area and the second emission area including one or more pixels;
    a camera configured to capture the display panel at one or more viewpoints; and
    a compensation controller calculating color coordinate data of the first emission area and the second emission area and generating grayscale compensation data based on the color coordinate data,
    wherein the grayscale compensation data is for controlling grayscale values of the one or more pixels included in the second emission area,
    wherein the one or more viewpoints include:
    a first viewpoint; and
    a second viewpoint inclined by a first angle from the first viewpoint, and
    wherein the compensation controller includes:
    a coordinate calculator,
    wherein the coordinate calculator is configured to calculate first color coordinate data of the first emission area corresponding to the first viewpoint, calculate second color coordinate data of the first emission area corresponding to the second viewpoint, and calculate third color coordinate data of the second emission area corresponding to the first viewpoint,
    wherein the compensation controller further includes:
    a compensation data generator,
    wherein the compensation data generator calculates first grayscale compensation data by adding a value obtained by subtracting the second color coordinate data from the first color coordinate data to the third color coordinate data.

2. The compensation system of claim 1, wherein the one or more viewpoints further include:
    a third viewpoint inclined by a second angle greater than the first angle from the first viewpoint,
    wherein the coordinate calculator calculates fourth color coordinate data of the first emission area corresponding to the third viewpoint, and
    wherein the compensation data generator generates second grayscale compensation data by adding a value obtained by subtracting the fourth color coordinate data from the first color coordinate data to the third color coordinate data.

3. The compensation system of claim 2, wherein the first grayscale compensation data includes information about grayscale values of the one or more pixels located in the second emission area corresponding to the second viewpoint, and wherein the second grayscale compensation data includes information about grayscale values of the one or more pixels located in the second emission area corresponding to the third viewpoint.

4. The compensation system of claim 3, wherein the compensation data generator interpolates the first grayscale compensation data and the second grayscale compensation data to generate the grayscale compensation data corresponding to at least one viewpoint existing between the second viewpoint and the third viewpoint.

5. The compensation system of claim 1, further comprising:
    a memory storing the grayscale compensation data,
    wherein the memory stores the grayscale compensation data in a form of a lookup table to correspond to each of the one or more viewpoints.

6. The compensation system of claim 1, further comprising:
    a visual sensor sensing user's eyes on the display device and generating visual sensing data; and
    a grayscale converter generating image data based on the grayscale compensation data and the visual sensing data.

7. The compensation system of claim 6, wherein the visual sensing data includes information about a position between the user's eyes and the display panel.

8. The compensation system of claim 1, wherein the first emission area is disposed in a center of the display panel, and
    wherein the second emission area is disposed around the first emission area.

9. A compensation method for a display device comprising:
    capturing a first emission area of a display panel at a first viewpoint;
    capturing the first emission area of the display panel at a second viewpoint inclined by a first angle from the first viewpoint;
    capturing a second emission area of the display panel at the first viewpoint, the second emission area being different from the first emission area;
    calculating color coordinate data of the first emission area and the second emission area; and
    generating grayscale compensation data based on the color coordinate data,
    wherein the grayscale compensation data is for controlling grayscale values of one or more pixels included in the second emission area,
    wherein the calculating the color coordinate data includes:
    calculating first color coordinate data of the first emission area corresponding to the first viewpoint;
    calculating second color coordinate data of the first emission area corresponding to the second viewpoint; and
    calculating third color coordinate data of the second emission area corresponding to the first viewpoint,
    wherein the generating the grayscale compensation data includes:
    calculating first grayscale compensation data by adding a value obtained by subtracting the second color coordinate data from the first color coordinate data to the third color coordinate data.

10. The compensation method of claim 9, further comprising:
    capturing the first emission area of the display panel at a third viewpoint inclined by a second angle greater than the first angle from the first viewpoint,
    wherein the calculating the color coordinate data includes:

calculating fourth color coordinate data of the first emission area corresponding to the third viewpoint.

11. The compensation method of claim 10, wherein the generating the grayscale compensation data includes:

calculating second grayscale compensation data by adding a value obtained by subtracting the fourth color coordinate data from the first color coordinate data to the third color coordinate data.

12. The compensation method of claim 11, wherein the generating the grayscale compensation data includes:

interpolating the first grayscale compensation data and the second grayscale compensation data to generate the grayscale compensation data corresponding to at least one viewpoint existing between the second viewpoint and the third viewpoint.

13. The compensation method of claim 12, wherein the first grayscale compensation data includes information about grayscale values of the one or more pixels located in the second emission area corresponding to the second viewpoint, and wherein the second grayscale compensation data includes information about grayscale values of the one or more pixels located in the second emission area corresponding to the third viewpoint.

14. The compensation method of claim 9, further comprising:

generating visual sensing data by sensing user's eyes on the display panel; and generating image data based on the grayscale compensation data and the visual sensing data.

* * * * *